(12) United States Patent
Achterman

(10) Patent No.: US 7,644,726 B1
(45) Date of Patent: *Jan. 12, 2010

(54) SELF-CLEANING FLOW SHUT OFF VALVE

(75) Inventor: Kermit L. Achterman, La Canada Flintridge, CA (US)

(73) Assignee: Kermit L. Achterman, & Associates, Inc., La Canada Flintridge, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 11/689,104

(22) Filed: Mar. 21, 2007

Related U.S. Application Data

(63) Continuation-in-part of application No. 11/535,194, filed on Sep. 26, 2006.

(51) Int. Cl.
*F16K 17/30* (2006.01)

(52) U.S. Cl. .................................. 137/498; 137/516.25

(58) Field of Classification Search ................. 137/494, 137/497, 498, 460, 512.1, 512.3, 516.25
See application file for complete search history.

(56) References Cited

U.S. PATENT DOCUMENTS

| | | | |
|---|---|---|---|
| 735,248 A | 8/1903 | Hahn | |
| 1,275,697 A | * 8/1918 | Joyce et. al. | ........... 137/329.01 |
| 1,796,455 A | 3/1931 | Gunn et al. | |
| 2,307,949 A | 1/1943 | Phillips | |
| 2,415,258 A | 2/1947 | Parker et al. | |
| 2,460,407 A | 2/1949 | Andrus | |
| 2,481,713 A | 9/1949 | Bertea | |
| 2,633,147 A | 3/1953 | Badami | |
| 2,912,000 A | 11/1959 | Green | |
| 2,924,237 A | 2/1960 | Ellis | |
| 3,347,266 A | * 10/1967 | Hausen | ........................ 137/540 |
| 3,434,495 A | * 3/1969 | Scaramucci | ................. 137/542 |
| 3,441,052 A | 4/1969 | Schilling | |
| 3,566,918 A | 3/1971 | Rauen | |
| 3,664,371 A | 5/1972 | Schneider | |
| 3,735,777 A | * 5/1973 | Katzer et al. | ............. 137/514.5 |

(Continued)

OTHER PUBLICATIONS

Notice of Allowance from USPTO received on Feb. 9, 2009 for relating U.S. Appl. No. 11/535,194.

(Continued)

*Primary Examiner*—John Rivell
*Assistant Examiner*—Macade Brown
(74) *Attorney, Agent, or Firm*—Klein, O'Neill & Singh, LLP

(57) ABSTRACT

A flow shut off valve for residential water line pressure includes a self cleaning valve element held in a housing having an inlet, an outlet section and an outlet adapter with a fluid passage connecting the inlet and the outlet adapter. The inlet and the outlet adapter include exterior threads for connection to a further item. The valve element is slidably mounted within a passage in a poppet guide and metering slot insert having one or more metering slots that allow variable fluid flow between the inlet and outlet adapter. A spring biases the valve element toward the inlet. Reduced back pressure at the outlet adapter drives the valve element into a closed position with a sealing surface against the valve seat to terminate flow. The flow shutoff valves are contemplated for integration with stop valves supplying water to employment with household appliances, sinks, toilets and the like.

10 Claims, 11 Drawing Sheets

U.S. PATENT DOCUMENTS

| | | | |
|---|---|---|---|
| 3,850,195 A | 11/1974 | Olsson | |
| 3,958,603 A | 5/1976 | Bannon et al. | |
| 5,240,036 A | 8/1993 | Morris | |
| 5,487,406 A | 1/1996 | Jirasek | |
| 5,546,981 A * | 8/1996 | Li et al. | 137/493.3 |
| 5,857,716 A | 1/1999 | Thomas | |
| 5,976,631 A | 11/1999 | Ramachandran | |
| 6,029,685 A * | 2/2000 | Carruth | 137/15.19 |
| 6,325,090 B1 * | 12/2001 | Horne et al. | 137/218 |
| 6,513,543 B1 * | 2/2003 | Noll et al. | 137/315.11 |
| 7,111,638 B2 | 9/2006 | Johnson | |
| 7,503,341 B1 * | 3/2009 | Achterman | 137/498 |

OTHER PUBLICATIONS

Notice of Allowance from USPTO received on Nov. 13, 2008 for relating U.S. Appl. No. 12/170,721.

Non-Final Office Action from USPTO dated Aug. 4, 2008 for relating U.S. Appl. No. 11/535,194.

* cited by examiner

SELF-CLEANING FLOW SHUT OFF VALVE

CROSS REFERENCE TO RELATED APPLICATIONS

This application is a continuation-in-part of pending application Ser. No. 11/535,194, which was filed on Sep. 26, 2006, entitled Self Cleaning Flow Shutoff Valve.

BACKGROUND OF THE INVENTION

1. Field of the Invention

The field of the present invention is generally flow shutoff valves for residential water line pressure and, more specifically, the use of such valves which are self cleaning and which may be used with stop valves for sinks, toilets, and the like.

2. Description of Related Art

Shutoff valves to prevent excess flow, such as when a sudden leak occurs downstream of the valve, are well known in the art. Such valves are found in high pressure hydraulic systems, fueling systems and critical gas systems. Such valves are relatively expensive because of complicated housings and/or valve elements, the materials, and their precision machining requirements.

Household water supplies to appliances, sinks and toilets; for example, water supplies to washing machines, sinks and toilets are most often connected to manual shutoff valves which are installed in the water line. The conventional means for connecting the manual shutoff valves to an appliance, or the like, are typically through flexible hoses. Personal experience and insurance statistics suggest that a great many such manual shutoff valves are not closed when appliances are not in use. Consequently, the integrity of the flexible hoses remains the only means of containing a household system water pressure to an appliance. Insurance companies in North America report payments amounting to hundreds of millions of dollars annually which solely result from broken household appliance hoses. Other statistics for sinks and toilet systems, not using flexible hoses, but which are subject to leaking or other problems are similar.

The shutoff valves used for hydraulics, fuels and gasses are out of practical range for use with home appliances. However, other solutions have been applied to the problem of residential flooding from appliance hoses in a number of ways. Electrical sensors, timers and valve drives have been devised. Mechanical devices have also been employed which are complicated, expensive and/or limited in their use.

One problem which must be addressed by shutoff devices for residential use is the presence of particles and hardness in the water supply which can accumulate to disable such valves. The utility of most shutoff valves is as an emergency device with very infrequent actuation. Consequently, interfering deposits can be built up with continued flow through the valve without actuation and result in malfunction of the valve when needed.

SUMMARY OF THE INVENTION

The present invention is directed to a flow shutoff valve for residential water line pressure and includes a housing, a valve element slidably mounted in the housing and a spring biasing the valve element. The housing includes a passage therethrough with at least a first cylindrical section. The valve element includes a sealing surface which is engageable with a valve seat about the passage in the housing. A flow restrictive passage is located between the inlet and the outlet with communication therethrough controlled by the valve element.

In a first separate aspect of the present invention, the valve element includes a cylindrical wall slidably engaging the first cylindrical section of the passage through the housing. Communication through the flow restrictive passage is closed with the valve element at the inlet end of its slidable mounting. Under this condition, the valve element operates as a piston through a distance responsive to the water pressure each time water begins to flow through the valve, performing a forced physical cleaning.

In a second separate aspect of the present invention, the valve element includes a cavity open to the inlet. The flow restrictive passage includes at least one restrictive orifice extending from the cavity to the periphery of the valve element. The restrictive orifice(s) is closed by the first cylindrical section with the valve element at the inlet end of its slidable mounting.

In a third separate aspect of the present invention, back pressure at the outlet dropping to near zero gauge pressure results in a force on the valve element greater than and opposed to the force of the spring. Further, the spring has a spring force with the valve element in the no-flow position which is less than the total force of the water line pressure on the valve element with the back pressure of the outlet at near zero gauge pressure.

In a fourth separate aspect of the present invention, the flow shutoff valve includes a motion damper operatively coupled between the housing and the valve element. This damper may include damping which is progressive with displacement. The motion damper may include a cavity and a plunger. The plunger can have an increasing cross-sectional area with increasing distance from the free end of the plunger for a first length of the plunger.

In a fifth separate aspect of the present invention, the flow shutoff valve includes a flexible hose having a proximal end attached to the outlet and a distal end, a line filter adjacent the distal end of the flexible hose and no line filter adjacent the proximal end of the hose or the flow shutoff valve.

In a sixth separate aspect of the present invention, any of the foregoing aspects are contemplated to be employed in combination to greater utility.

In a seventh separate aspect of the present invention, the flow shutoff valve for residential water line pressure is adapted to be used with or made integral with a stop valve for use with sinks, toilets and the like.

In an eighth separate aspect of the present invention, the flow shutoff valve is made more compact and smaller so as to be integrated with known stop valves and includes a poppet guide and metering slot insert with one or more metering slots therein for flow control therethrough.

Accordingly, it is an object of the present invention to provide an improved combination flow shutoff valve and stop valve. Other and further objects and advantages will appear hereinafter.

DETAILED DESCRIPTION OF THE PREFERRED EMBODIMENTS

Figure 1:
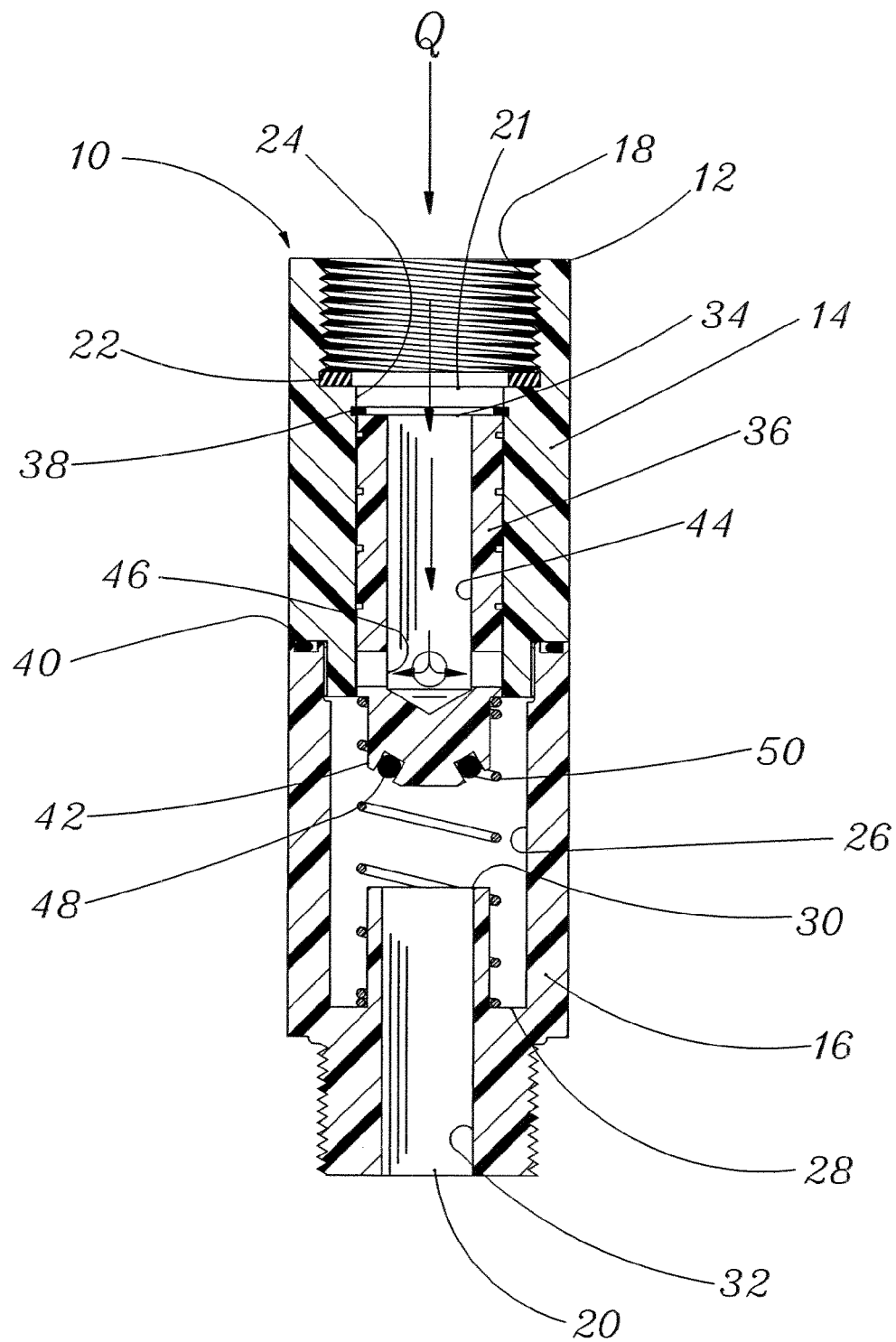
FIG. 1 is a cross-sectional view taken along the centerline of a flow shutoff valve in a position with no flow therethrough.
Figure 2:
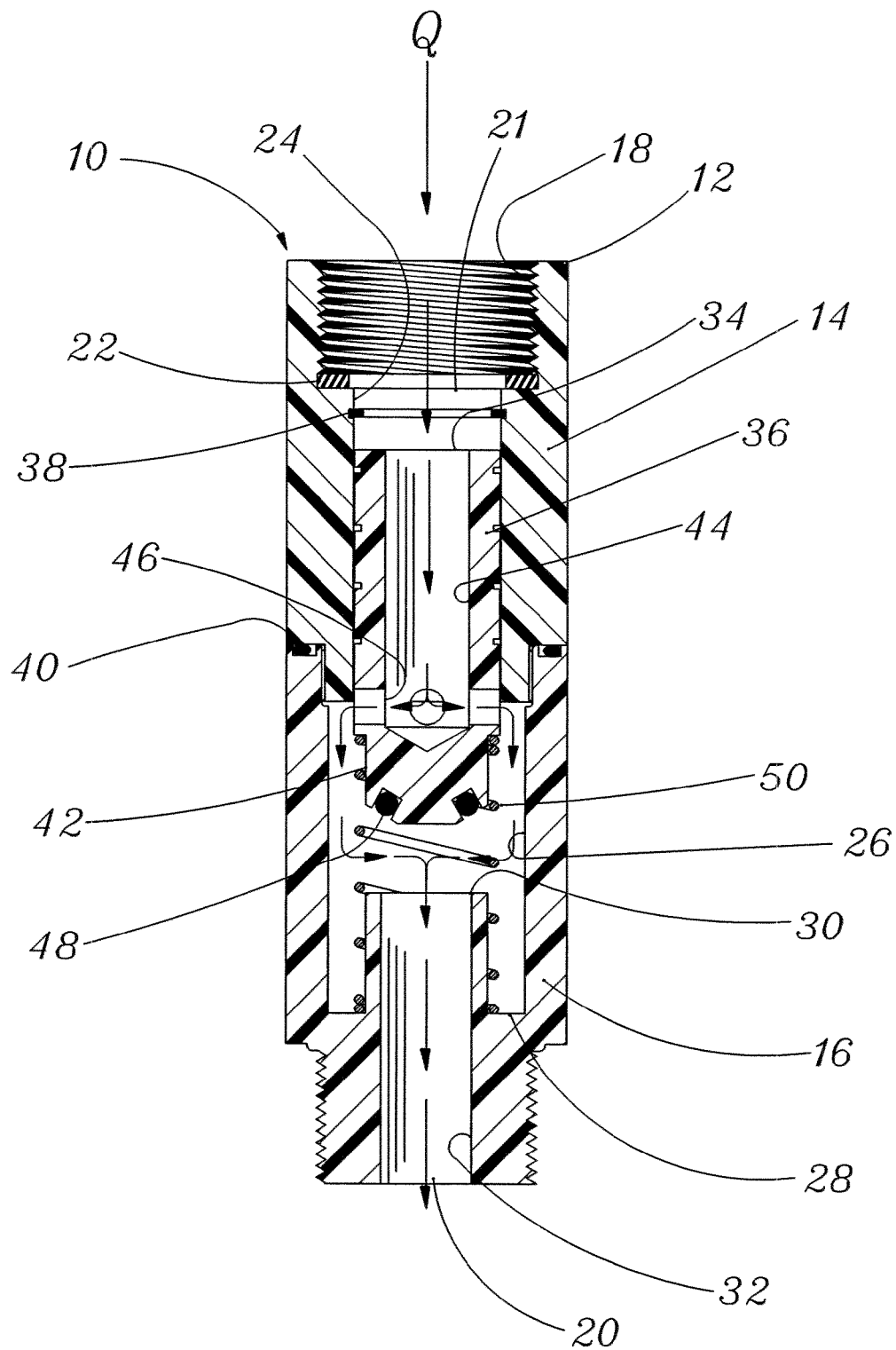
FIG. 2 is a cross-sectional view taken along the centerline of the flow shutoff valve in an intermediate position with flow therethrough.
Figure 3:
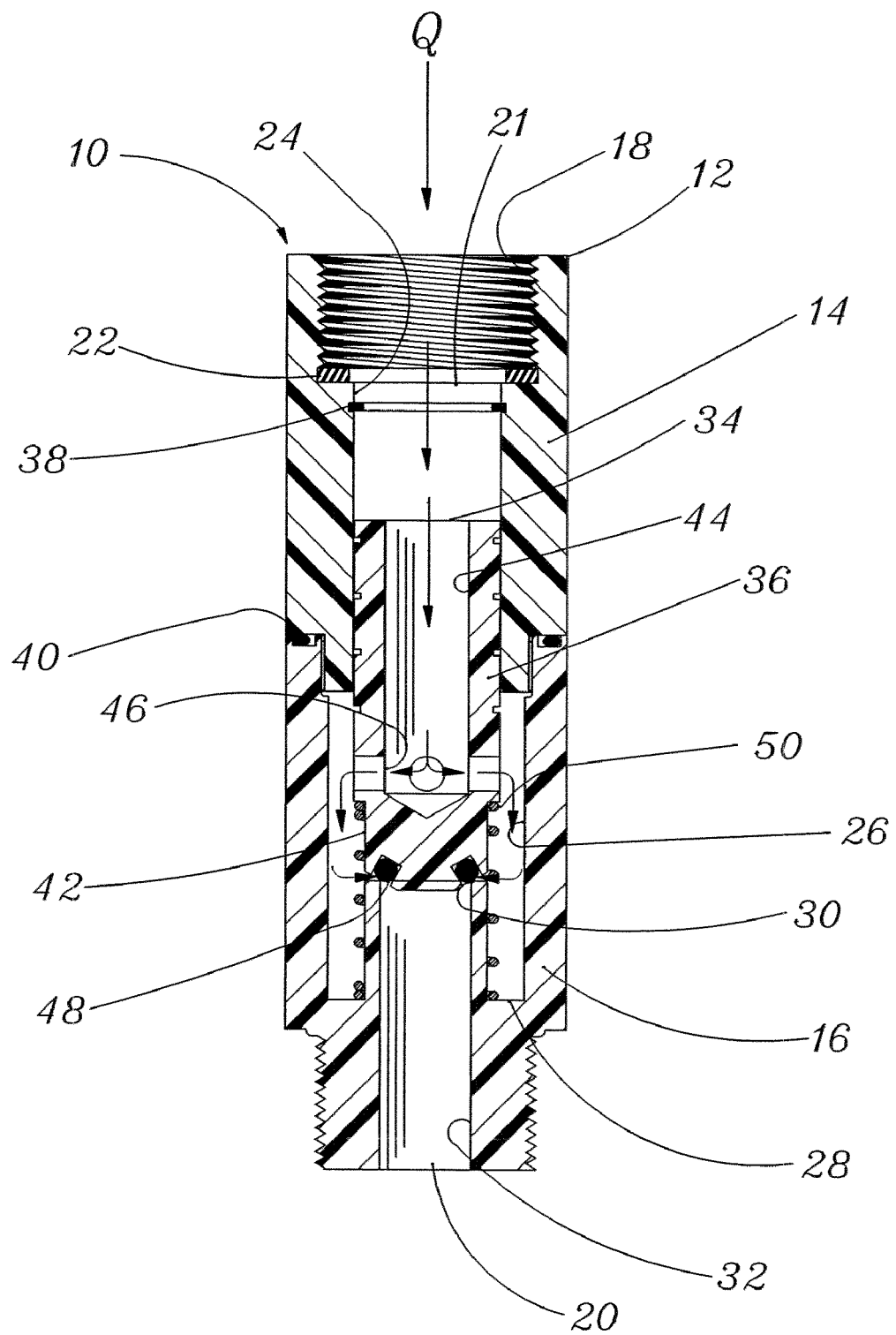
FIG. 3 is a cross-sectional view taken along the centerline of a flow shutoff valve in a shutoff position.

Turning in detail to FIGS. 1 through 3, a self cleaning flow shutoff valve for residential water line pressure is disclosed. The flow shutoff valve, generally designated 10, includes a housing 12. The housing 12 is constructed of an inlet section 14, and an outlet section 16. These sections may conveniently be of inexpensive plastic molding material. Such materials include polyvinyl chloride (PVC), chlorinated polyvinyl chloride (CPVC), acrylonitrile butadiene styrene (ABS) and other plastics. Brass or bronze may alternatively be employed. The sections 14, 16 are generally cylindrical. "Cylindrical" is used herein in the broader mathematical sense without necessarily being limited to a circular cylinder.

The inlet section 14 includes an inlet 18. The outlet section 16 includes an outlet 20. The inlet 18 and outlet 20 sections are shown to be threaded with female and male threads, respectively. The entire body of the housing 12 is preferably cylindrical at any cross section and the two sections 14, 16 include male and female engaged pilot diameters. The two sections 14, 16 may be bonded together or threaded together with an o-ring seal 40.

The resulting housing 12 defined by the two sections 14, 16 includes a passage 21 therethrough extending from the inlet 18 to the outlet 20. The passage 21 includes a washer 22 arranged at the inlet to prevent flow from backing out through the inlet 18.

The passage 21 further includes a cylindrical section 24 found inwardly of the inlet 18 and washer 22. This section 24 extends to a central section 26 of enlarged cross section also forming part of the passage 21. At one end of the central section 26, an annular spring seat 28 is arranged to accommodate a spring inwardly displaced from the wall of the passage 21 at the central section 26. A valve seat 30 is also located in the central section 26 at the annular spring seat 28. The valve seat 30 extends around the passage 21 as it defines an outlet channel 32.

A valve element 34 includes a cylindrical wall about its periphery which slidably engages the cylindrical section 24. The body 36 of the valve element 34 is of sufficient length and fit so that it will not bind with the cylindrical bore 24 in movement within the passage 21 and yet precludes any substantial flow between the cylindrical wall and the cylindrical section 24. The clearance between the body 36 and the cylindrical bore 24 is small but does not require that all fluid flow therebetween be prevented. A retaining ring 38 fits within a groove in the passage 21 at the first section 24. A spring clip may be employed for this ring 38. This limits the travel of the valve element 34 toward the inlet 18. A nose 42 of smaller diameter than the body 36 extends downwardly below the cylindrical wall of the body 36.

A flow restrictive passage is located between the inlet and the outlet with communication therethrough controlled by the valve element 34. In the preferred embodiment, the flow restrictive passage is defined by a central cavity 44 extending into the body of the valve element 34 from the inlet end. The cavity 44 does not extend fully through the valve element 34. Rather, several orifices 46 extend from the cavity 44 in a radial direction to the periphery of the valve element 34 for communication between the inlet and the outlet. Further the central section 26 can provide communication from the orifices 46 to the valve seat 30. A sealing surface 48 is arranged on the end of the nose 42 to cooperate with the valve seat 30 for closure of the passage 21.

A spring 50 is positioned in the annular spring seat 28 and is placed in compression against the shoulder created by the diameter change in the valve element 34. The spring 50 biases the valve element 34 toward the inlet and against the retaining ring 38.

In comparing FIGS. 1, 2 and 3, it may be noted that the valve element 34 is shown in three functional positions. A first position, as illustrated in FIG. 1, is with the valve element 34 positioned fully toward the inlet 18. A second position, as illustrated in FIG. 2, is an intermediate position with the orifices 46 in communication with the central section 26 and the valve 10 open. The second position actually spans a range of locations for the valve element 34. A third position, as illustrated in FIG. 3, is with the sealing surface 48 pressed against the valve seat 30. In the first position, the orifices 46 are closed by the cylindrical section 24 which closely surrounds the cylindrical periphery of the valve element 34. In this way, communication through the flow restrictive passage is closed. With no open passage, pressure builds up on the top of the valve element 34 which in turn acts as a piston and is forced downwardly by the water pressure every time the valve is opened. With the added force of the piston, the valve element 34 is cleared of any accumulation of particles and hardness on a regular basis. Further, the valve remains open with the sealing surface 48 displaced from the valve seat 30.

In the second position, flow proceeds relatively unimpeded by the mechanism with the exception of the design of the orifices 46. Under normal flow conditions, the valve element 34 remains in this intermediate position.

In the third position, the sealing surface 48 is on the valve seat 30 and there is no flow. It is through this range of positions that the flow shutoff valve 10 operates.

The spring 50 and the orifices 46 are empirically selected to accommodate residential water line pressure and household appliance flow rates. At normal flow, there is some pressure drop across the valve element 34. This pressure drop is due to flow resistance through the orifices 46 and general drag on the valve element 34. This pressure drop along with pressure imbalances resulting from velocity variations around the valve element 34 provides differential forces on the valve element 34. However, the orifices 46 and the spring 50 are selected to allow a certain range of flow through the flow shutoff valve 10 at a range of line pressures with the spring 50 retaining the valve element 34 in the intermediate zone of positions. This is accomplished by having the spring maintain a range of force on the valve element 34 that the hydraulic forces do not move the valve element 34 fully to the third position against the valve seat 30. Naturally, the spring 50 cannot resist the piston action of the valve element 34 as it moves from the first position to expose the orifices 46. As the residential water line pressure is reasonably stable during such flow, the back pressure at the outlet 20 significantly determines flow rate. This back pressure is developed at an appliance or other device in fluid communication with the outlet 20.

When the back pressure at the outlet 20 drops significantly, the differential pressure between the inlet 18 and the outlet 20 becomes substantially greater. In response, flow through the flow shutoff valve 10 increases. As the flow increases, greater resistance is provided by the orifices 46. Resulting hydraulic forces acting in the direction of flow increase. At a flow rate between 150% and 200% of anticipated normal flow, the resulting hydraulic force on the valve element 44 exceeds the opposing spring force from the compressed spring 50. Preferably the spring 50 is arranged such that the distance between the first and third positions does not greatly increase the spring force. This is accomplished with some precompression of the spring 50 in the first position and a small spring constant. With the resulting hydraulic force exceeding the spring force, the valve element 34 will move to the third position with the sealing surface 48 against the annular valve seat 30. As the sealing surface 48 engages the valve seat 30, flow is terminated.

Once there is no flow, the pressure about the valve element 34 equalizes at the line pressure. At this point, the only forces on the valve element 34 are the spring 50 and the imbalance between the line pressure and the lower pressure at the outlet channel 32 operating on the valve element 34 inwardly of the valve seat 30. With the outlet 20 being near zero gauge pressure, the differential pressure across the area of the outlet channel 32 retains the valve element 34 in the third position. Reinstating the flow shutoff 10 to the first or second positions is accomplished by reducing the line pressure sufficiently so that the spring 50 may force the valve element 34 back toward the inlet 18.

Figure 5:
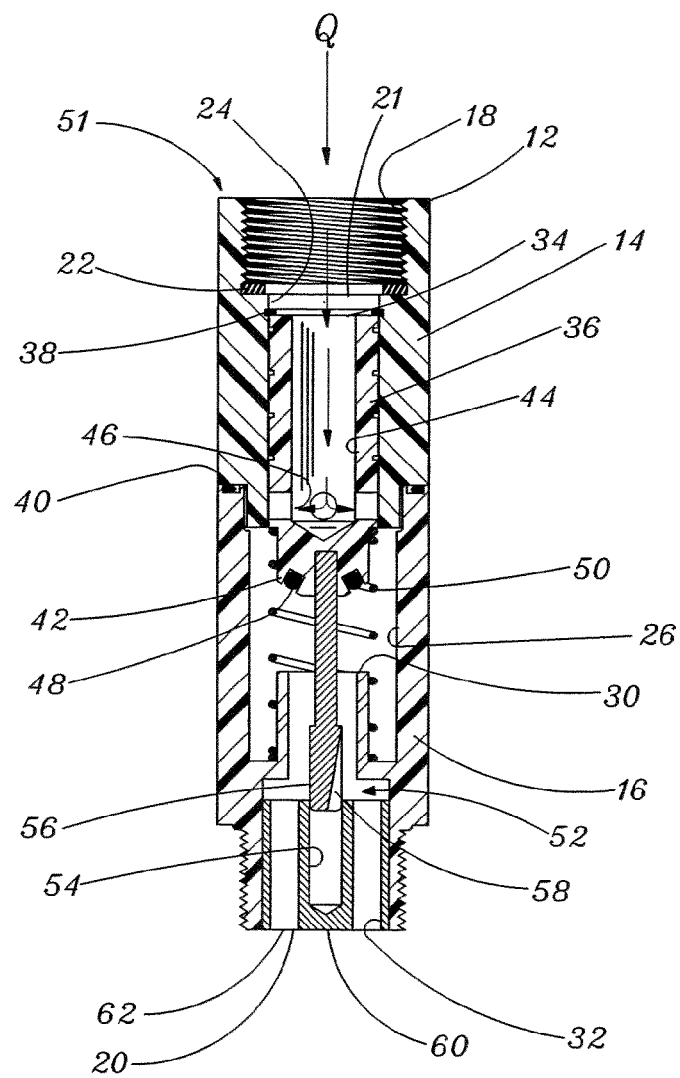
FIG. 5 is a cross-sectional view taken along lines 5-5 of FIG. 4.
Figure 4:
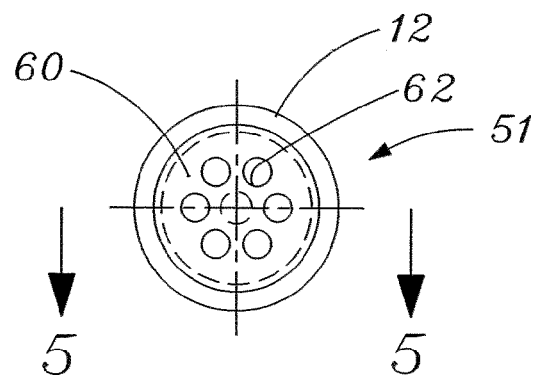
FIG. 4 is a bottom view of a second embodiment of a flow shutoff valve.

The second embodiment illustrated in FIGS. 4 and 5 includes the reference numbers applied to the first embodiment where functions are substantially to identical. This second embodiment of the flow shutoff valve, generally designated 51 principally differs in the provision of a motion damper, generally designated 52. The motion damper includes a cavity 54 associated with the housing 12 and a plunger 56 associated with the valve element 34. The first position of the valve element 34, as seen in FIG. 5, has the plunger 56 just entering the cavity 54. In the intermediate position the plunger 56 has more fully entered into the cavity 54 but has not bottomed out.

For a first distance, the plunger 56 increases in cross-sectional area by means of the chamfer 58. With this device, the damping resistance is progressive with displacement of the valve element 34 from the intermediate position toward the valve closed position.

To accommodate the motion damper 52, the housing 12 includes an insert 60, centrally defining the cavity 54, with multiple ports 62 thereabout. The ports are substantially larger in cumulative cross-section than the orifices 46. This allows a rapid drop in pressure below the valve element 34 with resulting closure of the shutoff valve 51 when pressure at the outlet 20 drops to near zero gauge. The insert 60 may be press fit or retained by bonding. A further variation from the first embodiment may be the employment of slip sockets, as the shutoff valve 51 is depicted in FIG. 7, particularly adaptable with PVC, CPVC and ABS type piping systems for bonding of the system components to the valve 51.

Figure 6:
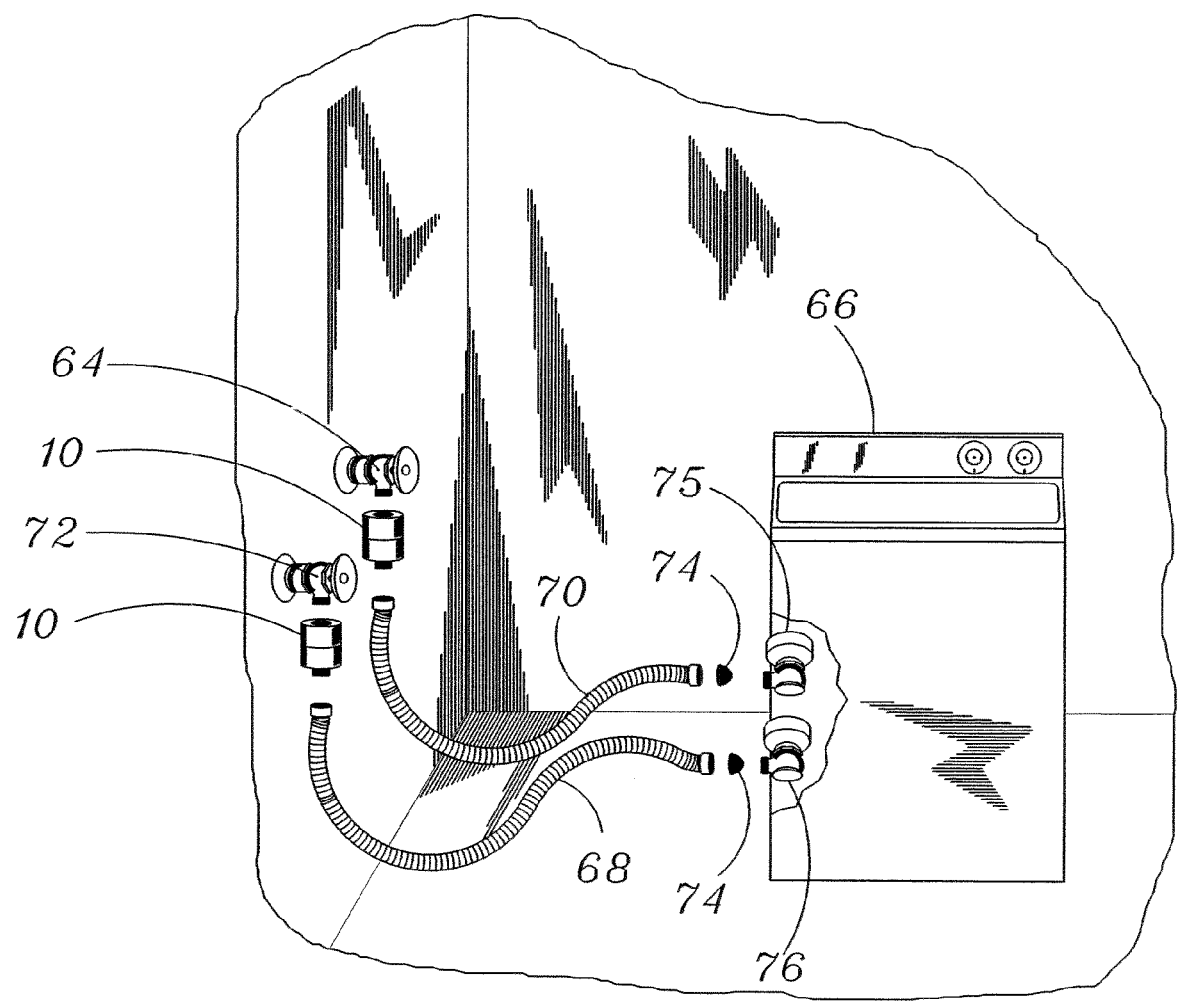
FIG. 6 is a perspective exploded assembly view of flow shutoff valves with an appliance.

FIG. 6 illustrates the use of flow shutoff valves 10 with a home appliance such as a washing machine 66. Flexible hoses 68, 70 are coupled with the flow shutoff valves 10 which are in turn coupled with the standard manual valves 64, 72. In the circumstance that a flexible hose 68, 70 breaks, water pressure within the hose and correspondingly at the outlet 20 would drop to near zero gauge pressure. Under this circumstance, the flow shutoff valve 10 would close by having the valve element 34 moved to the third position. The corresponding valve 64, 72 must then be closed before flow is restored through the flow shutoff valve 10.

The hoses 68 and 70 have proximal ends adjacent the shutoff valve 10 and distal ends at the appliance 66 or other device. A line filter 74 may be located adjacent the distal end of each of the hoses 68 and 70, where they connect to the appliance solenoid valves, 75 and 76, and no line filter is located adjacent the proximal end of the hoses 68 and 70 or the flow shutoff valve 10. As indicated above, particles and hardness accumulate from a domestic water line. If there is a filter before the flow shutoff valve 10, there is the danger of sufficiently clogging the line filter enough that flow would never reach the shutoff velocity through the flow shutoff valve 10 to properly actuate with a break in the hose. By placing line filters after the hoses, the increased flow from a break would not be reduced by an upstream clogged line filter.

Figure 7:
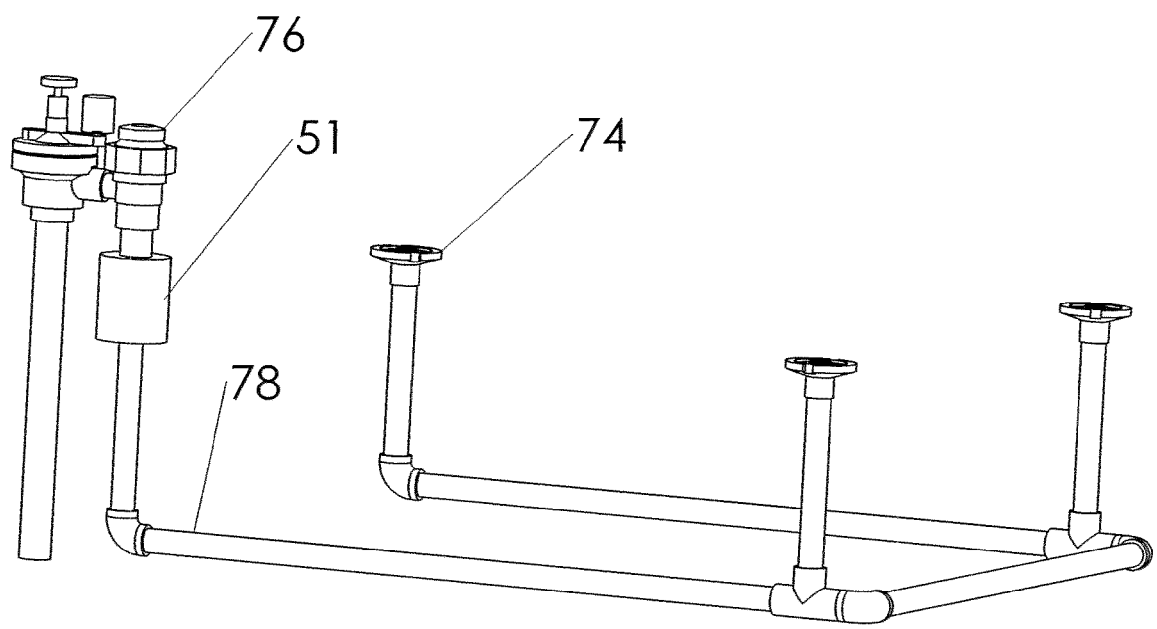
FIG. 7 is a perspective view of a flow shutoff valve with a sprinkler system.

FIG. 7 illustrates a sprinkler system including sprinklers 74, an anti-siphon valve 76 and sprinkler pipes 78. The motion damper 52 of the second embodiment has particular utility in the sprinkler system of FIG. 7. When the anti-siphon valve 76 is closed, the anti-siphon operates to release pressure and drain some of the sprinkler pipe 78. Therefore, when the anti-siphon valve is again opened, there is the possibility that the sprinkler piping 78, and correspondingly the outlet 20, will be at near zero gauge pressure until filled by line water. Without slowing the closure of the valve, this condition could prematurely close the shutoff valve.

Turning now to the third embodiment of the invention shown in FIGS. 8 through 11, a self cleaning flow shutoff valve for residential water line pressures and for connection to or use with a stop valve is disclosed. This flow shutoff valve is a miniaturized version for use in specific situations and is generally designated 110. A currently preferred version of this miniaturized flow shutoff valve is approximately ¾" in diameter by about 1.4" long. This flow shutoff valve 110 includes a housing 112, preferably constructed from metal and having an inlet section 114, an outlet section 116, sealed with an o-ring 126, and an outlet adapter 118. An o-ring seal 150 is used between the outlet section 116 and the outlet adapter 118. The sections 114, 116, and 118 are generally cylindrical. "Cylindrical" is used herein in the broader mathematical sense without necessarily being limited to a circular cylinder.

The inlet section 114 includes an inlet 120. The outlet adapter 118 includes an outlet 122. The inlet section 114 and the outlet adapter 118 are shown to be threaded with exterior male treads. The exterior threads on inlet section 114 provide for integration of the valve 110 into or with a standard commercial stop valve, such as 123 (see FIG. 12). The threads on outlet adapter 118 are varied to match a broad range of plumbing requirements. The entire housing 112 is preferably cylindrical at any cross section and the two sections 114, 116 may be bonded or threaded together. A poppet guide and metering slot insert 124 (best shown in FIG. 11) is fitted into the smooth bore of the inlet section 114, and is sealed with two o-rings 126. This poppet guide and metering slot insert 124 is preferably made from a ceramic or a glass filled polypropylene.

The resulting housing 112 defined by the three sections 114, 116, and 118 includes a passage 121 therethrough extending from the inlet 120 to the outlet 122. The passage 121 further includes a series of metering slots 128 formed in the poppet guide and metering slot insert 124.

The passage 121 further includes a cylindrical section 130 found inwardly of the inlet 120. This section 130 is preferably formed in the poppet guide and metering slot insert 124 and extends to a central section 132 also forming part of the passage 121. At one end of the central section 132 an annular spring seat 134 is arranged to accommodate a spring 136 inwardly displaced from the wall of passage 121 at the central section 132. A valve seat 138 is also located in the central section 132 at an end of the annular spring seat 134. The valve seat 138 extends around the passage 121 as it defines an outlet channel 140.

A cylindrical poppet type valve element 142 slidably engages the cylindrical section 130 of the poppet guide and metering slot insert 124. The body 144 of valve element 142 is of sufficient length and fit so that it will not bind with the cylindrical bore 130 in movement within the passage 121 and yet precludes any substantial flow between the body 144 and the cylindrical section 130. The clearance between the body 144 and the cylindrical section 130 of the poppet guide and metering slot insert 124 does not require that all fluid flow therebetween be prevented.

A nose 146 of smaller diameter than the body 144 of the valve element 142 extends downwardly, below the cylindrical housing 112. A valve o-ring sealing surface 148 is fitted to the nose 146 of the valve element 142.

A flow restrictive passage is located between the inlet 120 and the outlet 122 with communication therethrough controlled by the width and number of metering slots 128 in the poppet guide and metering slot insert 124. In the preferred embodiment, the flow restrictive passage is defined as the metering slots 128 which are cut into, or otherwise formed in the insert 124.

The number and width of slots 128 determine the amount of flow restriction. Further, the central section 132 can provide communication from the metering slots 128 to the valve seat 138. The sealing surface 148 is arranged on the end of the nose 146 to cooperate with the valve seat 138 for closure of the passage 121.

The spring 136 is positioned in the annular spring seat 134 and is placed in compression against the shoulder created by the diameter change in the body 144 of the valve element 142. The spring 136 biases the valve element 142 toward the inlet 120.

Figure 8:
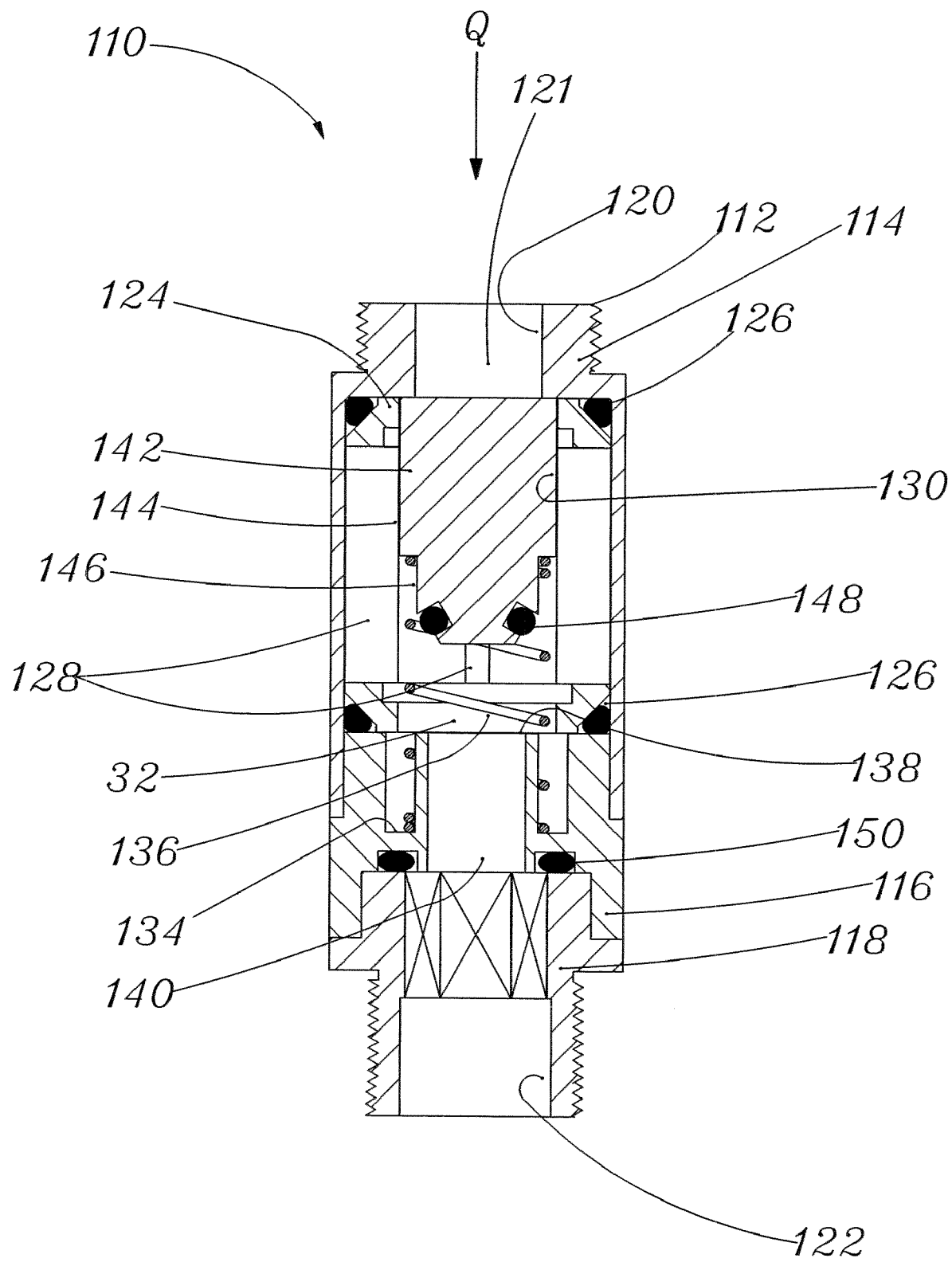
FIG. 8 is a cross-sectional view taken along the centerline of a third embodiment of a flow shutoff valve, in a position with no flow therethrough, for use with a stop valve.
Figure 9:
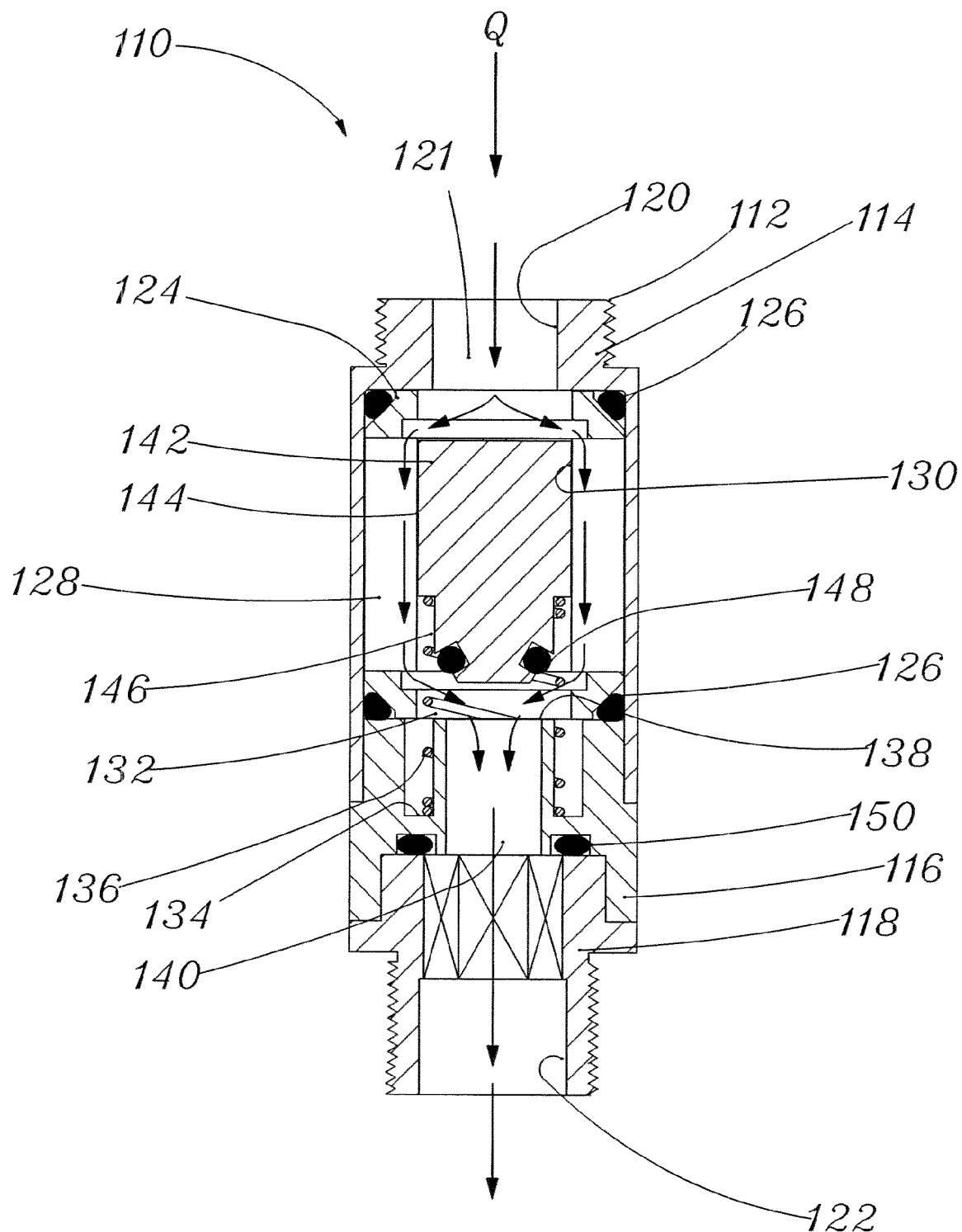
FIG. 9 is a cross-sectional view of the flow shutoff valve of FIG. 8, in an intermediate position with flow therethrough.
Figure 10:
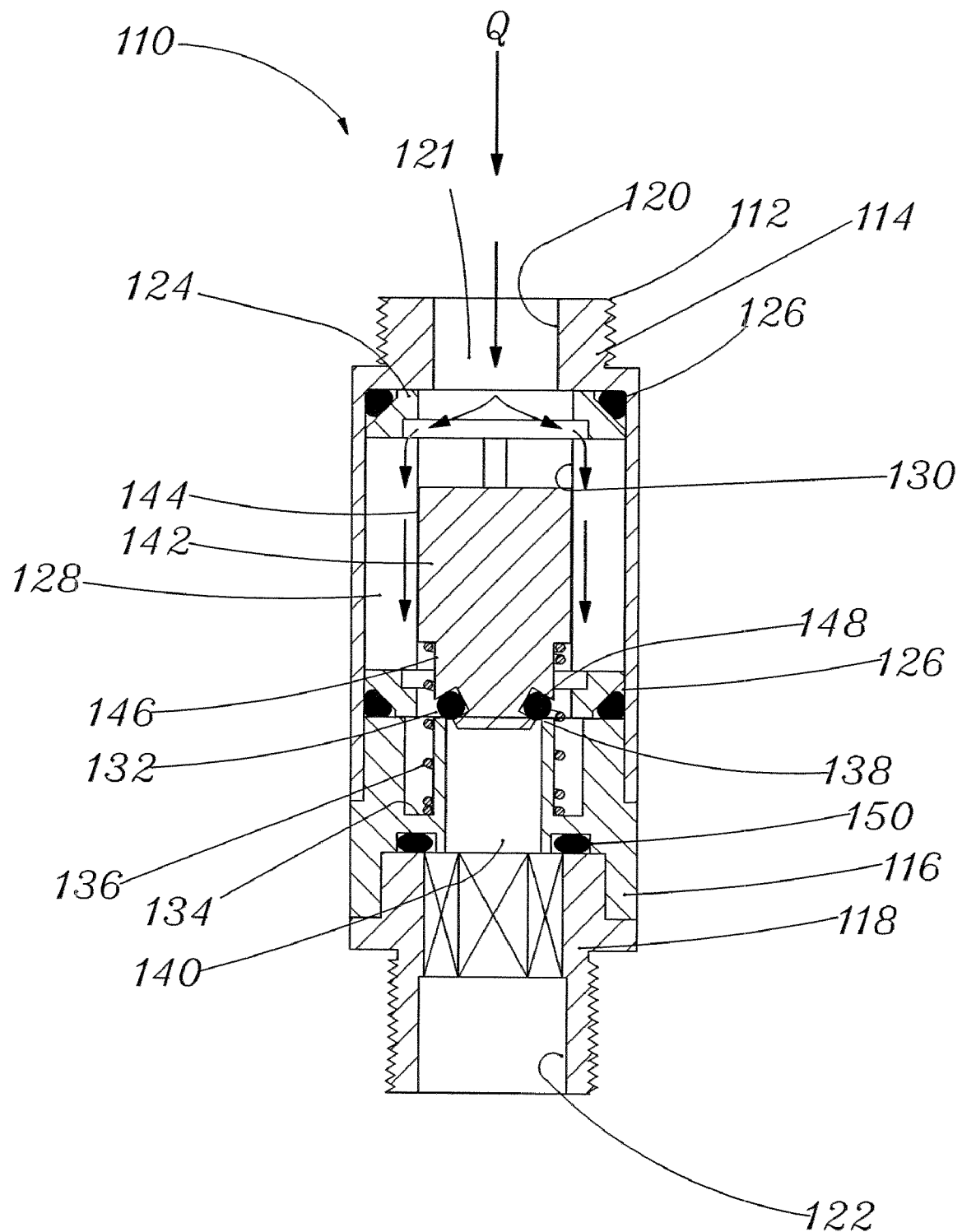
FIG. 10 is a cross-sectional view of the flow shutoff valve of FIG. 8, in a shutoff position.
Figure 11:
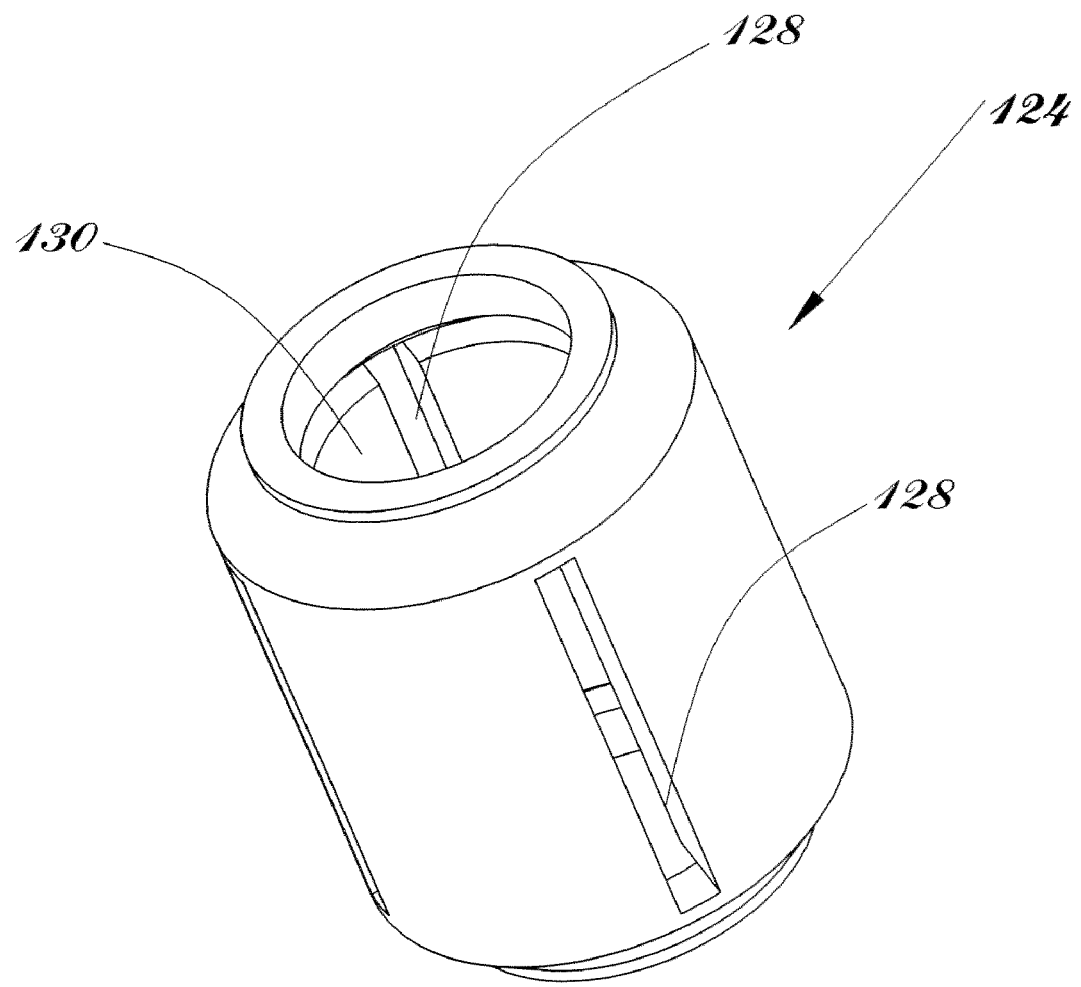
FIG. 11 is a perspective view of a poppet guide having a plurality of metering slots therein held in the housing of the flow shutoff valve of FIG. 8.

In comparing FIGS. 8, 9, and 10, it may be noted that the valve element 142 is shown in three functional positions. A first position, as illustrated in FIG. 8, is with the valve element 142 positioned fully toward the inlet 120, defining a valve closed position. A second position, as illustrated in FIG. 9, is an intermediate position with the metering slots 128 in communication with the inlet 120 and central section 132, defining a valve open position. The second position actually spans a range of locations for the valve element 142. A third position, as illustrated in FIG. 10, is with the sealing surface o-ring 148 pressed against the valve seat 138, defining a further valve closed position. In the first position, the metering slots 128 are closed by the upper portion of the cylindrical section 144 of the valve element 142. In this way, communication through the flow restrictive passage is closed. With no open passage, pressure builds up on the top of the valve element 142 which in turn acts as a piston and is forced downwardly by the water pressure every time the supply valve is opened. With the added force of the piston, the valve element 142 is cleared of any accumulation of particles and hardness on a regular basis. Further, the valve remains open with the sealing surface 148 displaced from the valve seat 138.

In the second position, flow proceeds relatively unimpeded by the mechanism with the exception of the design of the metering slots 128. Under normal flow conditions, the valve element 142 remains in this intermediate position.

In the third position, the sealing surface 148 is on the valve seat 138 and there is no flow. It is through this range of positions that the valve 110 operates.

The spring 136 and the metering slots 128 are empirically selected to accommodate residential water line pressure and household appliance, sink, and toilet flow rates. At normal flow, there is some pressure drop across the valve element 142. This pressure drop is due to flow resistance through the metering slots 128 and general drag of the valve element 142. This pressure drop, along with pressure imbalance resulting from velocity variations around the valve element 142, provides differential forces on the valve element 142. However, the metering slots 128 and the spring 136 are selected to allow a certain range of flow through the flow shutoff valve 110 at a range of line pressures with the spring 136 retaining the valve element 142 in the intermediate zone of positions. This is accomplished by having the spring 136 maintain a range of force on the valve element 142 that the hydraulic forces do not move the valve element 142 fully to the third position against the valve seat 138. Naturally, the spring 136 cannot resist the piston action of the valve element 142 as it moves from the first position to expose the metering slots 128, thus providing the self-cleaning action. As the residential water line pressure is reasonably stable during such flow, the back pressure at outlet 122 significantly determines flow rate. This pressure is developed at an appliance, toilet valve, sink valve, or other device in fluid communication with outlet 122.

When the back pressure at the outlet 122 drops significantly, the differential pressure between the inlet 120 and the outlet 122 becomes substantially greater. In response, flow through the flow shutoff valve 10 increases. As the flow increases, greater resistance is provided by the metering slots 128. Resulting hydraulic forces acting in the direction of flow increase. At a flow rate between 150% and 200% of anticipated normal flow, the resulting hydraulic force on the valve element 142 exceeds the opposing spring force from the compressed spring 136. This is accomplished with some pre-compression of the spring 136 in the first position and a small spring constant. With the resulting hydraulic force exceeding the spring force, the valve element 142 will move to the third position with the sealing surface 148 against the annular valve seat 138. As the sealing surface 148 engages the valve seat 138, flow is terminated.

Once there is no flow, the pressure about the valve element 142 equalizes at the line pressure. At this point, the only forces on the valve element 142 are the spring 136 and the imbalance between the line pressure at the inlet 120 and the lower pressure at the outlet 122 operating the valve element 142 inwardly of the valve seat 138. With the outlet 122 being near zero gauge pressure, the differential pressure across the area of the outlet channel 140 retains the valve element 142 in the third position. Reinstating the flow shutoff valve to the first or second position is accomplished by reducing the line pressure sufficiently so that the spring 136 may force the valve element 142 back toward the inlet 120.

Figure 12:
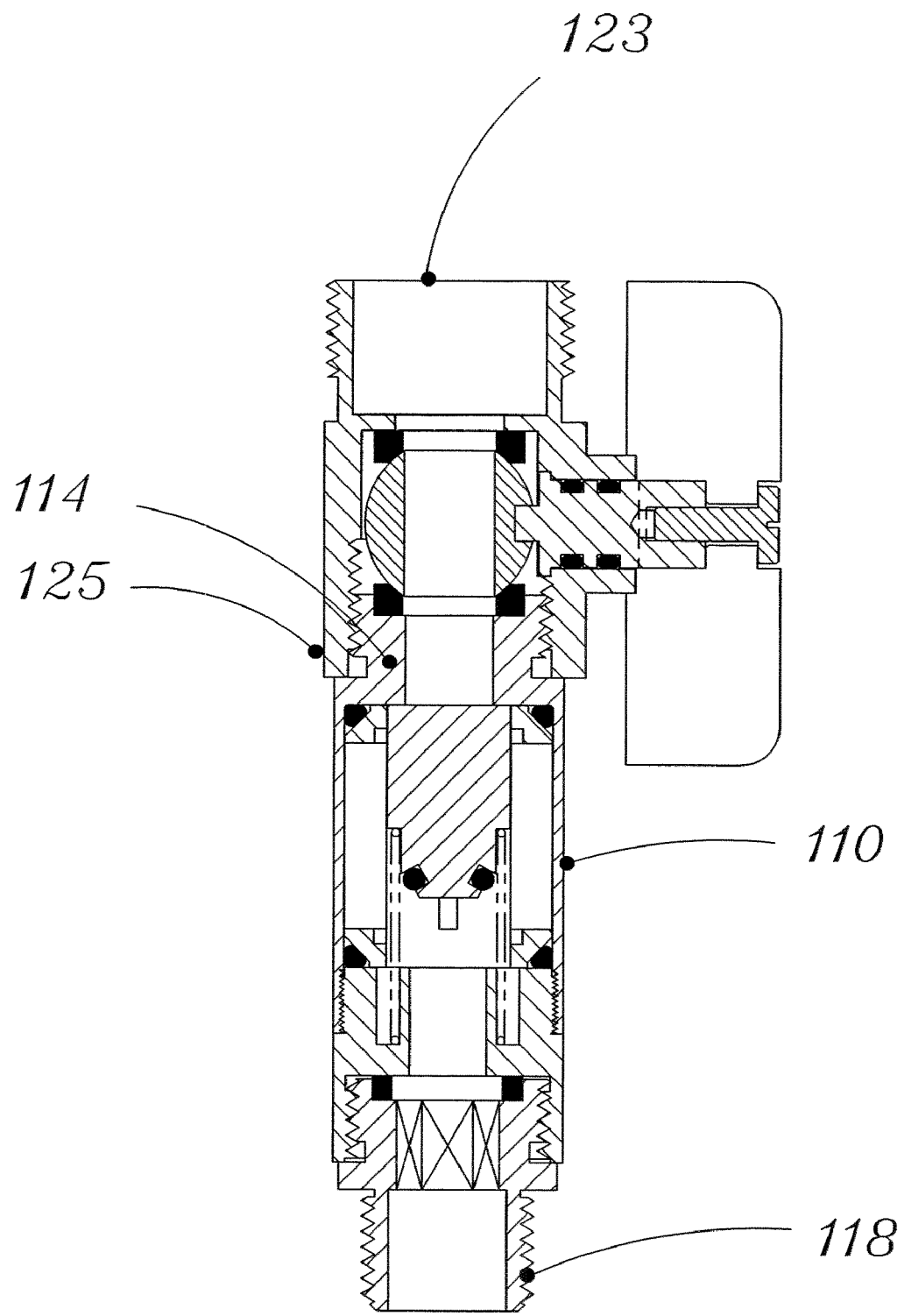
FIG. 12 is a cross-sectional view of the combination flow shutoff valve of FIG. 8 and a stop valve, with the flow shutoff valve, in a position with no flow therethrough.

FIG. 12 illustrates the connection or integration of flow shutoff valves 110 with stop valves 123. The exterior threads of the inlet section 114 are coupled to or inserted within female or internal threads formed on an outlet 125 of the stop valves 123 and retain a ball valve and O-ring or similar seal in place. The stop valves 123 may take any known configuration, such as ¼ turn stop valve, and are coupled to a water line (not shown), feeding water to the shutoff valve for delivery elsewhere. If water pressure downstream of the shutoff valve 110 drops to near zero gauge pressure, the flow shutoff valve 110 would close to cut off water flow, without the need to close the stop valves 123, except to reset the flow shutoff valve.

Thus, relatively simple, inexpensive and reliably responsive and self cleaning flow shutoff valves that may be used alone or integrated with stop valve have been disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A fluid flow shutoff valve comprising:
   a housing having an inlet section with an inlet, an outlet section with an outlet, and a passage between the inlet and the outlet, the outlet section including a valve seat, the valve seat and an internal surface of the outlet section defining boundaries of an annular space;
   a poppet guide and metering slot insert having at least one metering slot disposed within the inlet section, the at least one metering slot forming a perforation passing completely through a side wall of the poppet guide and metering slot insert,
   a valve element slidably mounted in the passage between a first position and a second position with at least one intermediate position therebetween and including a sealing surface at a downstream end, the sealing surface being configured to engage the valve seat, a wall of the valve element slidably engaging the poppet guide and metering slot insert; and
   a spring in compression between the housing and the valve element biasing the valve element toward the inlet and away from the valve seat, a downstream portion of the spring being disposed within the annular space;
   wherein the valve element is configured to control flow between the inlet and the outlet through the at least one metering slot, the first position being with the sealing surface displaced from the valve seat and communication through the at least one metering slot closed, the second position being with the sealing surface engaging the valve seat to completely seal flow through the valve seat and the at least one metering slot open to the inlet only, and the at least one intermediate position being with the sealing surface displaced from the valve seat and the at least one metering slot open to the inlet and the outlet.

2. The flow shutoff valve of claim 1, wherein the poppet guide and metering slot insert includes a plurality of metering slots.

3. The flow shutoff valve of claim 1, wherein the valve is configured for use at residential water line pressure.

4. The flow shutoff valve of claim 1, wherein the inlet section and outlet section are substantially cylindrical.

5. The flow shutoff valve of claim 1 in combination with a stop valve.

6. The flow shutoff valve of claim 5, wherein exterior threads on the inlet section are coupled to internal threads formed on an outlet of the stop valve.

7. The flow shutoff valve of claim 6, wherein the inlet section retains a ball valve and an o-ring seal in place within the stop valve.

8. The flow shutoff valve of claim 1, wherein the poppet guide and metering slot insert includes an inlet end having a counterbore on a downstream face, the counterbore providing a larger diameter compared to the inlet.

9. The flow shutoff valve of claim 1, further comprising a first sealing member disposed in a first space between an inlet end of the poppet guide and metering slot insert and the inlet section, the first sealing member preventing fluid leakage through the first space.

10. The flow shutoff valve of claim 9, further comprising a second sealing member disposed in a second space between an outlet end of the poppet guide and metering slot insert and the outlet section, the second sealing member preventing fluid leakage through the second space.

\* \* \* \* \*